(12) United States Patent
Rossi

(10) Patent No.: US 7,000,654 B1
(45) Date of Patent: Feb. 21, 2006

(54) SPONTANEOUS FULL FUEL TANK INDICATOR

(76) Inventor: Marc A. Rossi, 2314 Sailfish Cove Dr., West Palm Beach, FL (US) 33411

( * ) Notice: Subject to any disclaimer, the term of this patent is extended or adjusted under 35 U.S.C. 154(b) by 0 days.

(21) Appl. No.: 10/915,879

(22) Filed: Aug. 11, 2004

(51) Int. Cl.
*B65B 1/30* (2006.01)

(52) U.S. Cl. .......................... 141/95; 141/94; 141/198; 116/227

(58) Field of Classification Search ............... 141/83, 141/94, 95, 192, 198; 116/227; 220/86.2; 73/328
See application file for complete search history.

(56) References Cited

U.S. PATENT DOCUMENTS

| | | | | |
|---|---|---|---|---|
| 4,762,000 A | * | 8/1988 | Bond, Jr. ................... 73/290 R |
| 4,840,137 A | * | 6/1989 | Beauvais et al. ........... 116/227 |
| 5,947,372 A | * | 9/1999 | Tiernan ....................... 236/94 |
| 6,729,367 B1 | * | 5/2004 | Peterson ..................... 141/198 |
| 6,876,924 B1 | * | 4/2005 | Morita et al. ............... 701/211 |

* cited by examiner

*Primary Examiner*—Timothy L. Maust
(74) *Attorney, Agent, or Firm*—Rossi, Kimms & McDowell, LLP

(57) ABSTRACT

A spontaneous full fuel tank indicator is disclosed that allows an operator stationed at the fuel fill aperture of a motor vehicle to know when the fuel tank is completely filled. The indicator may be a visual display or an audible alert. The indicator may also be the CPU operation of a vehicle member such as the honking of the horn, flashing of the lights, or operation of the vehicle sound system. Alternatively, the indicator may be a visual, audible or vibratory alert at a key fob. The full fuel tank indicator operates in real-time without requiring a key in the ignition switch. A converter kit is also disclosed by which an existing vehicle may be equipped with a spontaneous full fuel tank indicator.

14 Claims, 2 Drawing Sheets

SPONTANEOUS FULL FUEL TANK INDICATOR

BACKGROUND OF INVENTION

This invention relates in general to an apparatus for a motor vehicle for the detection of a full fuel tank. In particular, the apparatus provides a real time confirmation detectable at the fuel fill aperture that the fuel tank has been filled to capacity.

Gasoline powered motor vehicles require the periodic addition of fuel to the fuel tank. When adding gasoline to the vehicle, it is common practice to attempt to fill the fuel tank to its capacity so as to maximize the driving distance that can be achieved before the fuel tank is depleted again. In most instances, an operator adds fuel by one of two methods: (1) standing at the vehicle fuel fill aperture to the fill pipe while manually depressing the trigger of a fuel pump nozzle that has been inserted into the fill pipe so as to allow fuel to flow into the gas tank, or (2) initially inserting the fuel pump nozzle into the fuel fill area, depressing the nozzle trigger, and then using a trigger prop located near the nozzle trigger to place and maintain the trigger in a position so as to allow fuel to flow into the vehicle. Regardless of the method used, in most instances, the fuel pump is automatically shut off at a certain point, indicating to the operator that the pump nozzle should be removed from the fuel fill aperture of the tank and the sale completed.

Although it is advantageous for the fuel pump to stop automatically so as to prevent spillover from the tank, in many cases the operator returns to the driver's seat and starts the vehicle only to observe from a dashboard display that the tank was not completely filled. At that point, after the sale has been completed, most operators consider it too troublesome to get back out of the car to initiate another sale for a relatively small amount of fuel in order to completely fill the tank. Instead, the operator is resigned to his or her fate of driving away from a fuel station without the desired full tank of gasoline. Without an indicator that is both noticeable to the operator positioned near the fuel fill aperture of the vehicle, and functional while the vehicle ignition is turned off, the operator cannot be certain that the fuel tank has been filled to its maximum capacity. Furthermore, if the operator yields to the temptation to top off the tank after the automatic shut-off, there remains the uncertainty as to how much additional fuel should be pumped: too little and the tank remains underutilized, too much and the operator risks exposure to the fuel overspill splash.

A display positioned at the fuel fill aperture was disclosed in U.S. Pat. No. 4,821,697 issued to McDougal on Apr. 18, 1989. McDougal teaches a fuel octane optimization system in which the driver is apprised of the octane requirements for the vehicle by a display. One suggested location for the display is at the fuel fill aperture. However, the system of McDougal does not provide an indication of whether the fuel tank has been completely filled.

A device related to a fluid filling operation was disclosed in U.S. Pat. No. 5, 762,118 issued on Jun. 9, 1998 to Epworth, et al. for an apparatus and method for the remote control of a filling function. Epworth teaches an apparatus and method by which a tank on a mobile vehicle could be filled by remote control. The apparatus includes a control valve, control assembly, and conduit by which an operator at a remote position is able to control the flow of fluid into a reservoir. The apparatus provides a means by which the operator selects a level of reservoir fullness at which the fluid flow would be terminated, so as to prevent wasteful overflow. The Epworth invention does not provide a full tank confirmation at the fill aperture.

There is a need for an apparatus that provides a real-time indication to a motor vehicle operator at the fuel fill aperture that the fuel tank is actually filled to capacity. Such an apparatus would indicate to an operator that more fuel may be added to the tank even though the automatic shut-off of the pump nozzle has stopped the refilling process. The apparatus would facilitate achieving the maximum driving distance between refueling stops, and minimize the operator time spent to engage in the refilling process.

There is a need for a real-time full fuel tank indicator that is functional without requiring the key to be turned in the ignition so that an operator standing outside the car by the fuel fill aperture can determine whether the fuel tank has been filled to its maximum capacity. Returning to the driver's seat to turn the ignition key while the pump nozzle remains engaged in the fill pipe is time-consuming as well as potentially hazardous since there is the risk of unintentionally turning the key to full ignition. Disengaging the pump nozzle eliminates the risk, but also terminates the refueling process and sale. If the driver returns to the driver seat after disengaging the pump nozzle, turns the key, and then observes that the tank has not been filled, adding more fuel would require the driver to repeat the entire refueling process. Despite their disappointment with being unable to obtain a full tank of gas, most drivers would opt to drive away rather spend additional frustrating minutes repeating the refueling process.

There is a need for a full tank indicator that functions in real time and is observable by an operator at the fuel fill aperture so that an operator that desires to add additional fuel to ensure a full tank after the pump is automatically shut off can do so safely. An operator could slowly add fuel until the indicator alerts the operator that the fuel tank is indeed full. At this point the operator could discontinue pumping and avoid overfill splash and spray. Likewise, an operator with a pump nozzle that does not have an automatic shut-off would know at what point the tank has been filled so as to terminate the refilling process safely.

SUMMARY OF THE INVENTION

The invention provides a means by which an operator positioned at the fuel fill aperture of a motor vehicle is informed that the fuel tank has been completely filled. The driving distance that can be realized is maximized by indicating to the operator whether the tank has actually been filled to capacity when the automatic shut off by the pump nozzle initially stops the flow of fuel into the tank. If the tank has not been completely filled, the operator can safely add additional fuel to the tank so as to achieve more driving time before another refueling stop is required.

This invention further provides an immediate indication of the fill status of the fuel tank so as to preclude the operator from having to return to the driver's seat and turn the key in the ignition switch in order to observe the fuel gauge. Returning to the driver's seat is time-consuming and potentially hazardous if the fuel pump nozzle remains engaged in the fill pipe. Avoiding the risk by returning the nozzle to the pump terminates the refueling process and requires that the process be repeated if more fuel is to be added. The present invention eliminates the need for risk exposure or additional time spent at the filling station in order to obtain a legitimate full tank.

This invention further provides a means by which an operator who is cognizant of the fact that the tank of his vehicle is not full when the pump is automatically shut off, or an operator at a pump without an automatic shut-off, can safely continue the refueling process. This invention indicates to the operator at the fuel fill aperture the point at which full capacity has been reached so that the operator is able to discontinue pumping prior to overfilling the tank.

BRIEF DESCRIPTION OF THE DRAWINGS

Embodiments of the present invention will be described, by way of example, with reference to the accompanying drawings, wherein.

DETAILED DESCRIPTION OF THE PREFERRED EMBODIMENT

Figure 1:
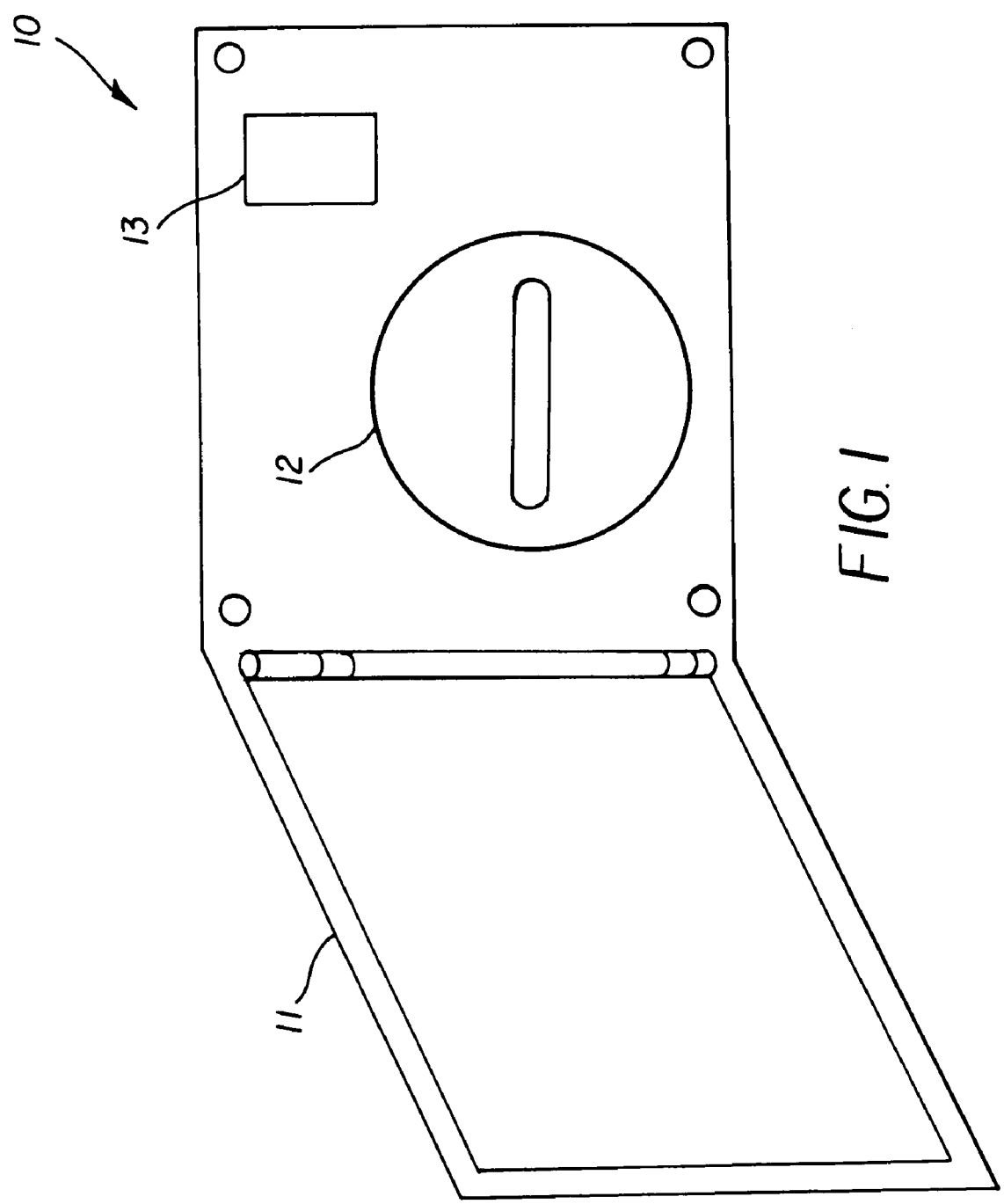
FIG. 1 illustrates one embodiment of a spontaneous full fuel tank indicator in accordance with the invention.

Referring to FIG. 1, there is a fuel tank filler assembly 10 equipped with the present invention. A fuel cap cover door 11 is in an open position revealing the presence of a fuel cap 12 and an indicator 13, located in near proximity to the fuel cap 12 and protected by the fuel cap cover door 11 when the fuel cap cover door 11 is in a closed position.

Operation of the spontaneous full fuel tank indicator occurs in the following manner. As the vehicle fuel tank is filled, a liquid level sensor positioned in the fuel tank detects the fluid level in the fuel reservoir. A liquid level sensor is commonly present in vehicles to operate the fuel tank gauge located on the dashboard. A variety of liquid level sensors exist, including float switches, space electrodes and capacitance type sensors. When the liquid level sensor detects a fluid level at a maximum position, the indicator 13, coupled with the liquid level sensor, contemporaneously conveys the filled status to the vehicle operator.

The indicator 13 can be exemplified in the form of a visual display that appears only when the tank is full. In this embodiment, the indicator 13 is switched ON when the liquid level sensor indicates that the maximum fluid level has been attained. The indicator 13 is then switched OFF when the fluid is no longer at its maximum level. To improve efficiency, the embodiment may require that either the fuel cap cover door 11 be open or the fuel cap 12 be disengaged in order for power to be supplied to the indicator 13. In an alternative embodiment, the indicator 13 may change color when the fluid level of the reservoir reaches its maximum point. The indicator 13 may also take the form of an LCD or a gauge that indicates the fraction of the fuel tank that has been filled.

In FIG. 1, the indicator 13 is located in an area proximate to the fuel cap so as to be discernible to an operator positioned at the fuel fill aperture. The indicator 13 may be located within the confines of the area defined by the fuel cap cover door 11. Alternatively, the indicator 13 may be located on the vehicle exterior, a window, or at any location inside or outside the vehicle so as to be visible to an operator at the fuel fill aperture.

Figure 2:
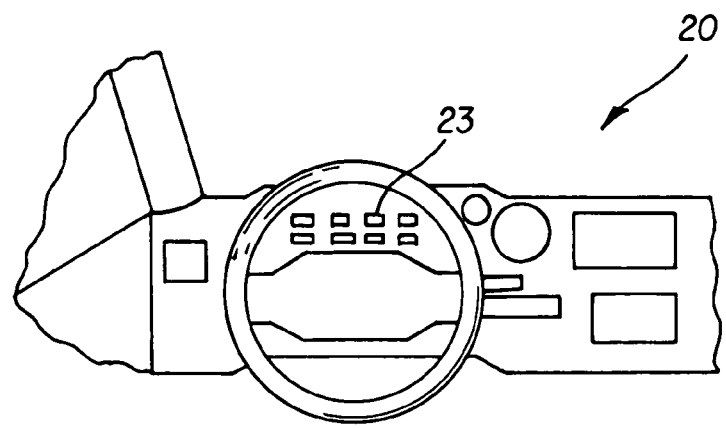
FIG. 2 illustrates a second embodiment of a spontaneous full fuel tank indicator in accordance with the invention.

A further embodiment of the invention is illustrated in FIG. 2 which depicts a dashboard display panel 20. In this embodiment, an indicator 23 provides an audible alert to the vehicle operator. The audible alert may be generated by a buzzer, a voice generator, or other audible source generator. The source of the audible alert may be at any location on the interior or exterior of the vehicle so long as it is audible to an operator outside the vehicle at the fuel aperature. As discussed above, to improve efficiency, the embodiment may require that the fuel cap cover door 11 be open in order for the indicator 23 to be operational. In addition to the audible alert, the indicator 23 may also include a visual display that operates in conjunction with the audible alert.

Figure 3:
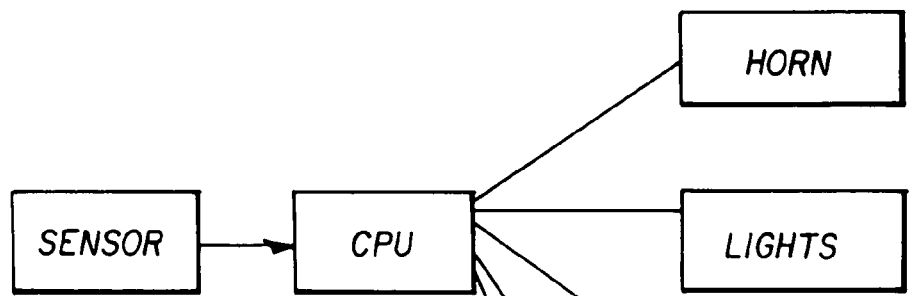
FIG. 3 illustrates a flow diagram of an embodiment of the present invention.

In a further embodiment of the invention, a liquid level sensor is coupled with the vehicle CPU, as exemplified in FIG. 3. In this configuration, when the liquid level sensor detects a full status, the status is conveyed to the vehicle operator by the operation of a CPU-controlled member of the vehicle. For example, the CPU may command the horn to honk, the vehicle lights to flash, the vehicle sound system to be turned on, the windows to be raised and lowered, or the wipers to be turned on. Although utilization of the existent vehicle CPU as a controller is the preferred mode of operation, it is also possible to use a separate controller to switch a vehicle member or other indicator means.

Figure 4:
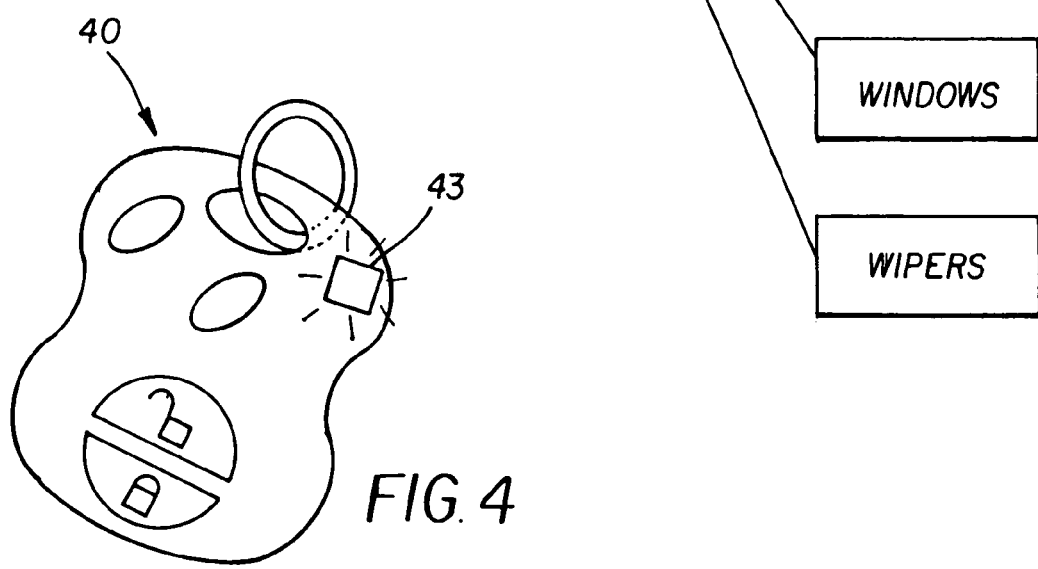
FIG. 4 illustrates a further embodiment of the invention.

An alternate embodiment of the invention is depicted in FIG. 4. In this case, the indicator is positioned on a portable device such as a key fob 40. An operator who steps away from the vehicle with the portable device, perhaps to enter an office or convenience store associated with the filling station, would still be given notice that the fuel tank has been filled even though the vehicle may temporarily be out of immediate sight. The indicator 43 on the key fob 40 may be a visual indicator, an audible indicator, or a combination thereof. The indicator 43 may also be manifested as a vibration of the key fob 40. The indicator 43 located at the key fob 40 may operate in conjunction with indicators 13 or 23 at the vehicle, or with a CPU-controlled vehicle member as explained in FIG. 3.

The optimum time to install the various embodiments of the invention is during the manufacture of the vehicle. However, it is also desirable to provide a means by which an existing vehicle may be adapted to accommodate the invention. For this purpose, a converter kit may be utilized. The kit contains the elements necessary to couple the liquid level sensor already present in the fuel tank with an indicator detectable by an operator at the fuel fill aperture. The elements contained in the kit may vary depending on the type and location of indicator desired. The kit may also contain the necessary software and/or hardware so as to configure the vehicle CPU to control the indicator.

The invention has been described with reference to certain preferred embodiments thereof. It will be understood, however, that modifications and variations are possible within the scope of the appended claims. For example, future motor vehicles may have potential, heretofore undeveloped features controlled by a CPU that could be utilized as a means of indicating a full fuel tank to an operator at the fuel fill aperture. The indicator may be coupled with the liquid level sensor via a controller other than the vehicle CPU. The coupling between the elements of the spontaneous full fuel tank indicator may be performed by either wired or wireless means. Accordingly, all modifications attainable by one versed in the art from the present disclosure within the scope and spirit of the present invention are to be included as further embodiments of the present invention.

What is claimed is:

1. A spontaneous full fuel tank indicator for a motor vehicle comprising:

a fuel level sensor that produces an electrical fuel level signal indicative of a fuel level of the fuel tank; and a first fuel level indicator and a second fuel level indicator each responsive to the electrical fuel level signal generated by the fuel level sensor to indicate the fuel level of the fuel tank;

wherein the first fuel level indicator is positioned proximate to a fuel fill aperture of the vehicle so as to be visually or audibly discernible to an operator positioned at the fuel fill aperture, and wherein the second fuel level indicator is located on a dashboard display panel of the vehicle.

2. A spontaneous full fuel tank indicator as claimed in claim 1, wherein the first fuel level indicator is activated when a fuel filler door of the vehicle is opened.

3. A spontaneous full fuel tank indicator as claimed in claim 1, wherein the first fuel level indicator is a visual indicator.

4. A spontaneous full fuel tank indicator as claimed in claim 3, wherein the first fuel level indicator is a liquid crystal display.

5. A spontaneous full fuel tank indicator as claimed in claim 3, wherein the first fuel level indicator is a gauge.

6. A spontaneous full fuel tank indicator as claimed in claim 1, wherein the first fuel level indicator generates an audible signal.

7. A spontaneous full fuel tank indicator as claimed in claim 1, further comprising a controller coupled with the fuel level sensor and the first fuel level indicator, wherein the controller controls the operation of the first fuel level indicator based on the fuel level signal generated by said fuel level sensor.

8. A spontaneous full fuel tank indicator as claimed in claim 7, wherein the controller is a CPU of the motor vehicle.

9. A spontaneous full fuel tank indicator as claimed in claim 8, wherein the filet level indicator comprises a vehicle member.

10. A spontaneous full fuel tank indicator as claimed in claim 9, wherein the vehicle member comprises a vehicle light.

11. A spontaneous full fuel tank indicator for a motor vehicle comprising:

a fuel level sensor;

a fuel level indicator responsive to a fuel level signal generated by the fuel level sensor to indicate a fuel level of the fuel tank, said fuel level indicator comprising a vehicle member; and a controller coupled with the fuel level sensor and the fuel level indicator that controls the operation of the fuel level indicator based on the fuel level signal generated by said fuel level sensor;

wherein the fuel level indicator is positioned such that an operator located at a fuel fill aperture of the vehicle can ascertain the fuel level indicated by the fuel level indicator; and wherein the vehicle member comprises a vehicle horn.

12. A spontaneous fill fuel tank indicator for a motor vehicle comprising:

a fuel level sensor;

a fuel level indicator responsive to a fuel level signal generated by the fuel level sensor to indicate a fuel level of the fuel tank, said fuel level indicator comprising a vehicle member; and a controller coupled with the fuel level sensor and the fuel level indicator that controls the operation of the fuel level indicator based on the fuel level signal generated by said fuel level sensor;

wherein the fuel level indicator is positioned such that an operator located at a fuel fill aperture of the vehicle can ascertain the fuel level indicated by the fuel level indicator; and wherein the vehicle member comprises a vehicle sound system.

13. A spontaneous full fuel tank indicator for a motor vehicle comprising:

a fuel level sensor;

a fuel level indicator responsive to a fuel level signal generated by the fuel level sensor to indicate a fuel level of the fuel tank; and a controller coupled with the fuel level sensor and the fuel level indicator that controls the operation of the fuel level indicator based on the fuel level signal generated by said fuel level sensor;

wherein the fuel level indicator is portable and can be carried away from the vehicle by a vehicle operator to a position remote from the motor vehicle.

14. A spontaneous full fuel tank indicator as claimed in claim 13, wherein the fuel level indicator generates a vibration discernable to the vehicle operator.

\* \* \* \* \*